United States Patent [19]

Sztipanovits et al.

[11] Patent Number: 5,249,274
[45] Date of Patent: Sep. 28, 1993

[54] SIMULTANEOUS DATA-DRIVEN AND DEMAND-DRIVEN COMPUTATIONAL MODEL FOR DYNAMICALLY CONFIGURED SYSTEMS

[75] Inventors: Janos Sztipanovits; Csaba Biegl; Gabor Karsai, all of Nashville, Tenn.

[73] Assignee: Vanderbilt University, Nashville, Tenn.

[21] Appl. No.: 602,961

[22] Filed: Oct. 24, 1990

[51] Int. Cl.$^5$ .................... G06F 15/16; G06F 13/14
[52] U.S. Cl. .................... 395/375; 395/650; 395/800; 364/DIG. 1; 364/232.22
[58] Field of Search ............ 364/200, 900, DIG. 1, 364/DIG. 2; 395/600, 650, 700, 200, 325, 375, 800, 700 MS File

[56] References Cited

PUBLICATIONS

Sztipanovits et al., Proceedings of the NASA/JPL Symposium on Telerobotics, pp. 131–139, 1987.
Tanenbaum, Operating Systems, 1987 pp. 60–63.
Padalkar et al., Proc. of the Fourth Conf. of Artificial Intelligence for Space Applns., pp. 115–124, 1988.
Sztipanovits et al, International Journal of Intelligent Systems, vol. 3, pp. 269–280, 1988.
Sztipanovits et al, Proceedings of the Third IEEE Conf. on Artificial Intelligence Applications, pp. 126–133, 1987.
Biegl et al, Innovation et Technologie en Biologie et Medicine, vol. 10, No. 2, pp. 205–216, Feb. 1989.
Sztipanovits et al, Coupling Symbolic & Numerical Computing in Expert Systems, II, pp. 117–128, 1988.
Sztipanovits, Measurement, vol. 7, No. 3, pp. 98–108, Jul.–Sep. 1989.
Sztipanovits et al, Biomed Meas Infor Contr, vol. 1, No. 3 pp. 140–146, 1986.
Sztipanovits et al, IEEE/Seventh Annual Conf. of the Engineering in Medicine & Biology Society, pp. 1132–1136, 1985.
Sztipanovits, Proceedings of the IEEE International Symposium on Circuits & Systems, pp. 2359–2362, 1988.
Blokland et al, Proceedings of the American Control Conf. pp. 620–626, 1988.
Karsai et al, Proceedings of the American Control Conf., 1988.
Karsai et al, Proceedings of the IEEE Symposium of Intelligent Control, pp. 4650–4656, 1988.
Sztipanovits et al, Robotics & Automation, May 1990.

*Primary Examiner*—Paul V. Kulik
*Assistant Examiner*—John C. Loomis
*Attorney, Agent, or Firm*—Fish & Richardson

[57] ABSTRACT

In a model-based dynamically configured system, various processing components are created dynamically, interfaced to each other, and scheduled upon demand. A combination of data driven and demand-driven scheduling techniques are used to enhance the effectiveness of the dynamically configured system.

18 Claims, 6 Drawing Sheets

SIMULTANEOUS DATA-DRIVEN AND DEMAND-DRIVEN COMPUTATIONAL MODEL FOR DYNAMICALLY CONFIGURED SYSTEMS

BACKGROUND OF THE INVENTION

The invention relates in general to model-based dynamically configured systems, and in particular, to a scheduling method and apparatus for model-based dynamically configured systems.

Model-based techniques have recently begun to be applied to building large-scale engineering applications. Models are used to represent complex industrial facilities, such as a manufacturing plant or a distribution center. The model describes the different components of the industrial process and how the components operate and interact with each other.

The models are interpreted by a knowledge-based interpreter which generates executable code to represent the engineering application. The operation, physical parameters, etc., of each component of the industrial process correspond to and are encompassed by a unit of executable code, and data is passed from one unit of code to another as the program executes. The interpreter configures the final system from elementary building blocks, such as signal processing routines or controller modules. The system configuration is generated dynamically from the model, and the model and the system can be modified during system operation to reflect changes in the environment.

Two types of schedulers, data-driven and demand-driven, are used in prior art model-based dynamically configured systems to control the execution of the various components. In demand-driven scheduling, the scheduler executes only the executable code components that are needed to provide the requested data. When an executable code component receives data, it will not propagate the data forward through the system until requested. In data-driven scheduling, the executable code component executes immediately only when necessary input data becomes available.

Most prior art systems use data-driven activity scheduling because the application systems are typically data-driven, and have real-time constraints. However, in many applications, it is desirable to provide an alternative mechanism, such as demand-driven scheduling, for scheduling the computational units of the system. This is particularly useful for activities that must be requested by an operator or that are initiated by an uncommon event, and that have more flexible time constraints.

It is also more advantageous to use demand-driven activity scheduling in applications where there are a potentially very large number of schedulable activities in the system, but only a subset of them are producing results which are desired at a given moment. Demand-driven activity scheduling, in such cases, offers a better way to utilize the system resources.

In other applications, it would be advantageous to offer both types of scheduling at the same time. This would allow certain activities to execute as data becomes available and other activities to execute only upon user demand. For example, data acquisition, preprocessing, and control loops could be executed as data becomes available, but data plotting and statistical analysis would be performed only when requested.

It is therefore an object of the present invention to provide a model-based dynamically configured system that allows both a demand-driven scheduling mode and a data-driven scheduling mode simultaneously.

It is a further object of the present invention to provide a model-based dynamically configured system which allow some parts of the system to operate in a data-driven mode, while other parts simultaneously operate in a demand-driven mode.

SUMMARY OF THE INVENTION

In the model-based dynamically configured system of the present invention, the control structure of the system is represented by models, or graphs, which are built of actor nodes, data nodes, and connection specifications.

Each actor node is associated with a particular computational unit and with a local data structure. The actor nodes perform transformations on data streams by running an application module. Data nodes store either raw data, data produced by actor nodes, or a pointer to data. Data nodes also store a set of connections which specify the connection of actor nodes to data nodes. Each data node also has associated with it a data propagation enable flag specifying data-driven or demand-driven modes.

When the data propagation enable flag is set, the control model runs in the data-driven mode. Each data packet is immediately propagated to the consumer actor nodes as it is produced. Once an actor node receives all the input data it needs, it becomes schedulable, and it will be executed as soon as there are available resources.

When the data propagation enable flag is cleared, the control model runs in the demand-driven mode. As data packets are received at the data nodes, they are stored. The data packets are not propagated to actor nodes unless there is an outstanding request from the actor node.

An outstanding request is generated when a read command is issued to an empty data node. When an empty data node receives such a command (or request), it triggers the execution of an actor node that could possibly supply the desired data. These actor nodes will begin executing even though all of their inputs are not present. Once an actor node begins executing and attempts to obtain the necessary data, if data does not yet exist, the actor node will propagate the request backwards through the control model.

In the demand-driven mode of operation, when the actor node begins executing, it will try to read the data from the data node. If the data does not yet exist, the actor node can be programmed to either use an algorithm that allows the use of only a subset of data or to propagate the request one step backwards in the computational graph, to the input data nodes of the actor and to set an "outstanding request" flag. The actor node's execution will then be aborted.

The request continues to be propagated backwards from actor node to actor node until a data node which is already storing data is reached. This backwards propagation results in a set of request paths in the control model, along which the required data can be propagated in a forward direction by performing the computations associated with the actor nodes in the path.

The propagation technique (in the demand mode) ensures that only the computations that are necessary to satisfy the original request, and not other activities, are actually performed. As the data is sent back through the model, the outstanding request flags of the involved data nodes are cleared, and no computations can be started in the control model parts which use demand-driven evaluation until a new request is received.

The scheduler thus allows the control model to operate in either data-driven mode, demand-driven mode, or a combination of both. The scheduler enables local selection of these modes by associating a data propagation enable flag with each data node.

BRIEF DESCRIPTION OF THE DRAWINGS

Other objects, features, and advantages of the invention will be apparent from the following description, taken together with the drawings, in which.

DETAILED DESCRIPTION OF A PREFERRED EMBODIMENT

The computational model of the present invention uses connected "actor nodes" and "data nodes" to represent the components and the dataflow of a dynamically configured system. Each actor node is associated with a particular computational unit and with a local data structure. Each data node can contain either raw data or a pointer to data. Control structures modeling the system are represented by models which are built of actor nodes, data nodes, and connection specifications. The system can operate using either demand-driven or data-driven scheduling, or a combination of both.

Figure 1:
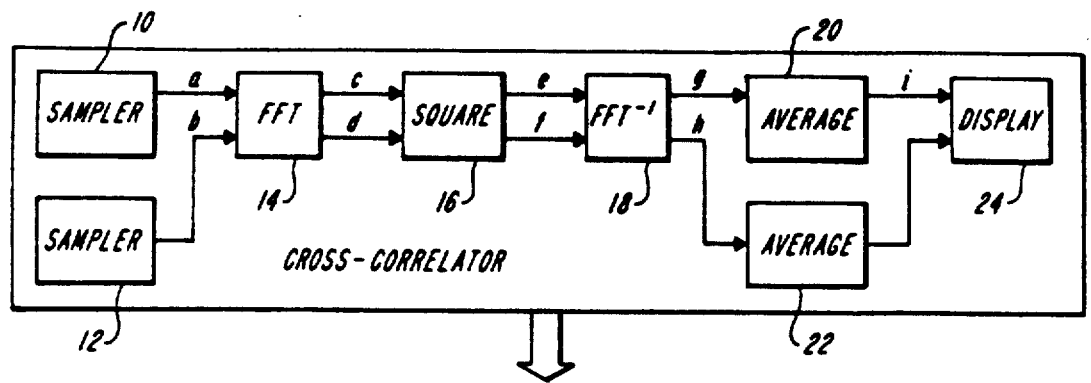
FIG. 1 is a signal flow model of a cross correlator.

FIG. 1 shows a signal flow model of a particular application, a cross correlator. The model is represented in the present invention using graphical declarative programming. A graphic toolset is associated with a special declarative language and is used to represent a combination of elements that form a variety of structures. The graphics are used to describe a particular situation and its operational requirements symbolically. This provides a powerful software engineering method for building, modifying and testing complex structures. Thus, according to FIG. 1, the cross correlator takes samples a and b by samplers 10 and 12, performs a fast Fourier transform at 14, and squares, at squarer 16, the resulting outputs c and d. The inverse fast Fourier transform is taken at 18 and the outputs g and h are averaged, respectively in averaging circuits 20 and 22. The result is presented on display 24.

Figure 2:
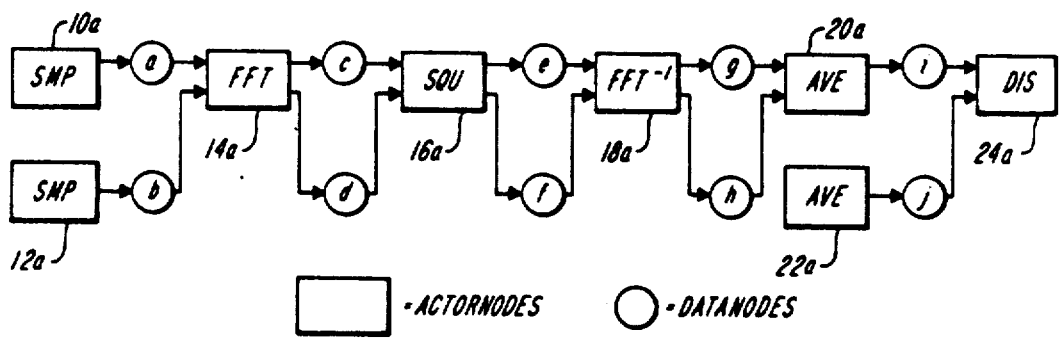
FIG. 2 is a control model of the cross correlator shown in FIG. 1.

Referring to FIG. 2, the apparatus of the invention generates a network of elementary program modules from the model of FIG. 1. The elementary program modules, or actor nodes (the rectangular shaped boxes), perform specific tasks in the complex system. The actor nodes are small modules of executable code, each module corresponding to a piece of the model created in the specification illustrated in FIG. 1. This design modularity allows changes in the model to be reflected in the executable code without regenerating the entire system. Modularity also allows parallel execution of the modules. The actor nodes are interconnected by data nodes (the circular elements) which store or point to the data and corresponding blocks are labeled with corresponding notations in FIGS. 1 and 2.

Figure 3:
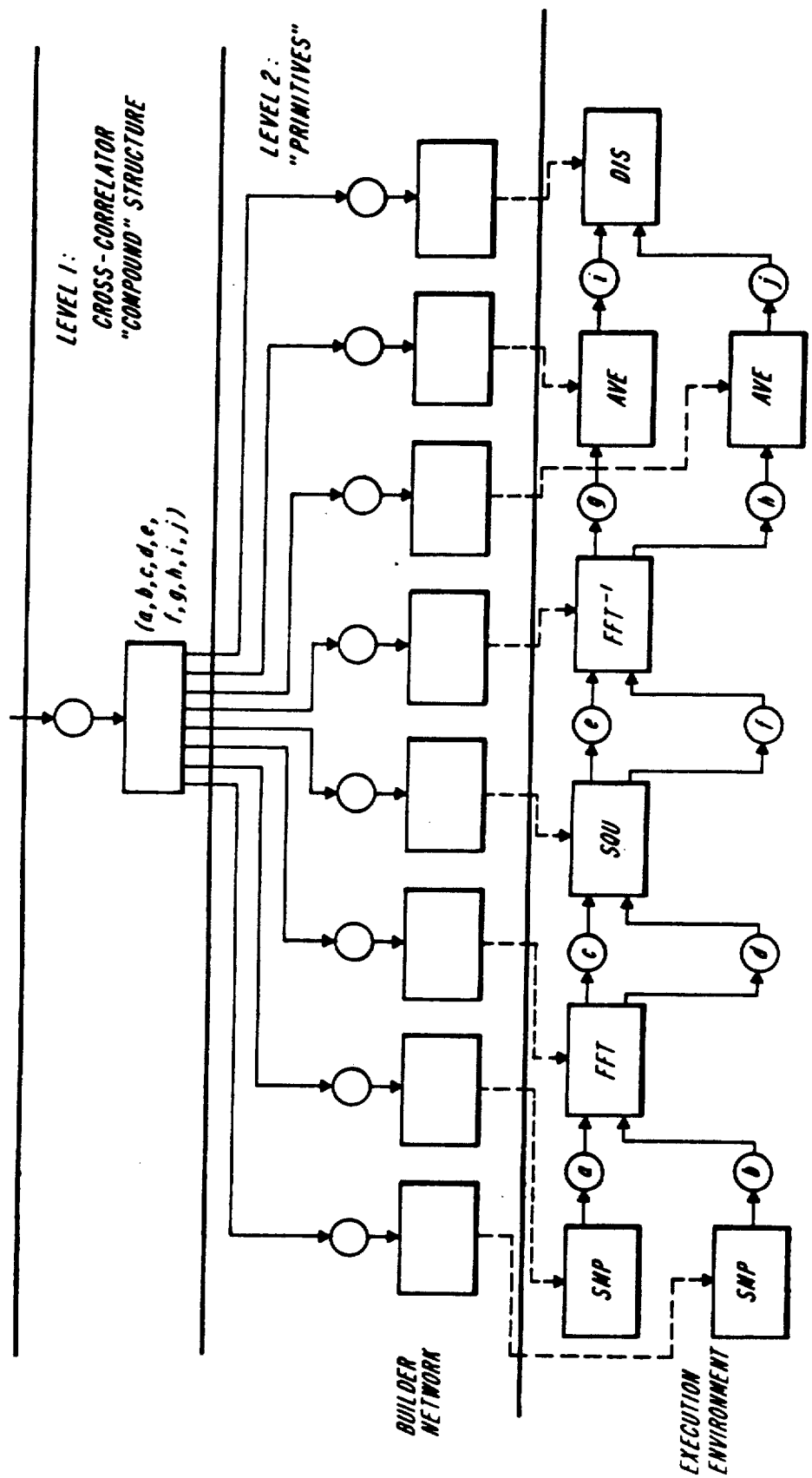
FIG. 3 is a builder network of the cross correlator shown in FIG. 1 and FIG. 2.

FIG. 3 shows the structure of the system, which allows the model to change dynamically. As the model changes, the model interpreter can adapt the executable code without regenerating the entire mass of code. Additionally, the program itself can respond to a change in the system and generate a change in the model, which is then reflected in the executable code. Because some of the modules can be executed at the same time, this structure allows parallel processing or multitasking.

The scheduler is needed in order to tell each elementary computation unit when to execute. There are two types of schedulers in the prior art, demand-driven and data-driven. In demand-driven scheduling, the scheduler executes only the computational units that are needed in order to provide the requested data. In data-driven scheduling, the computational units execute when the necessary input data becomes available.

The scheduler of the present invention can be a demand-flow scheduler, a data-flow scheduler, or both. It is not dependent upon a particular operating system, but can interface with a variety of computer systems.

Demand-driven activity scheduling offers a better way to utilize the system resources when there are a potentially very large number of schedulable activities in the system, but only a subset of them are producing results which are desired at a given moment.

Figure 4:
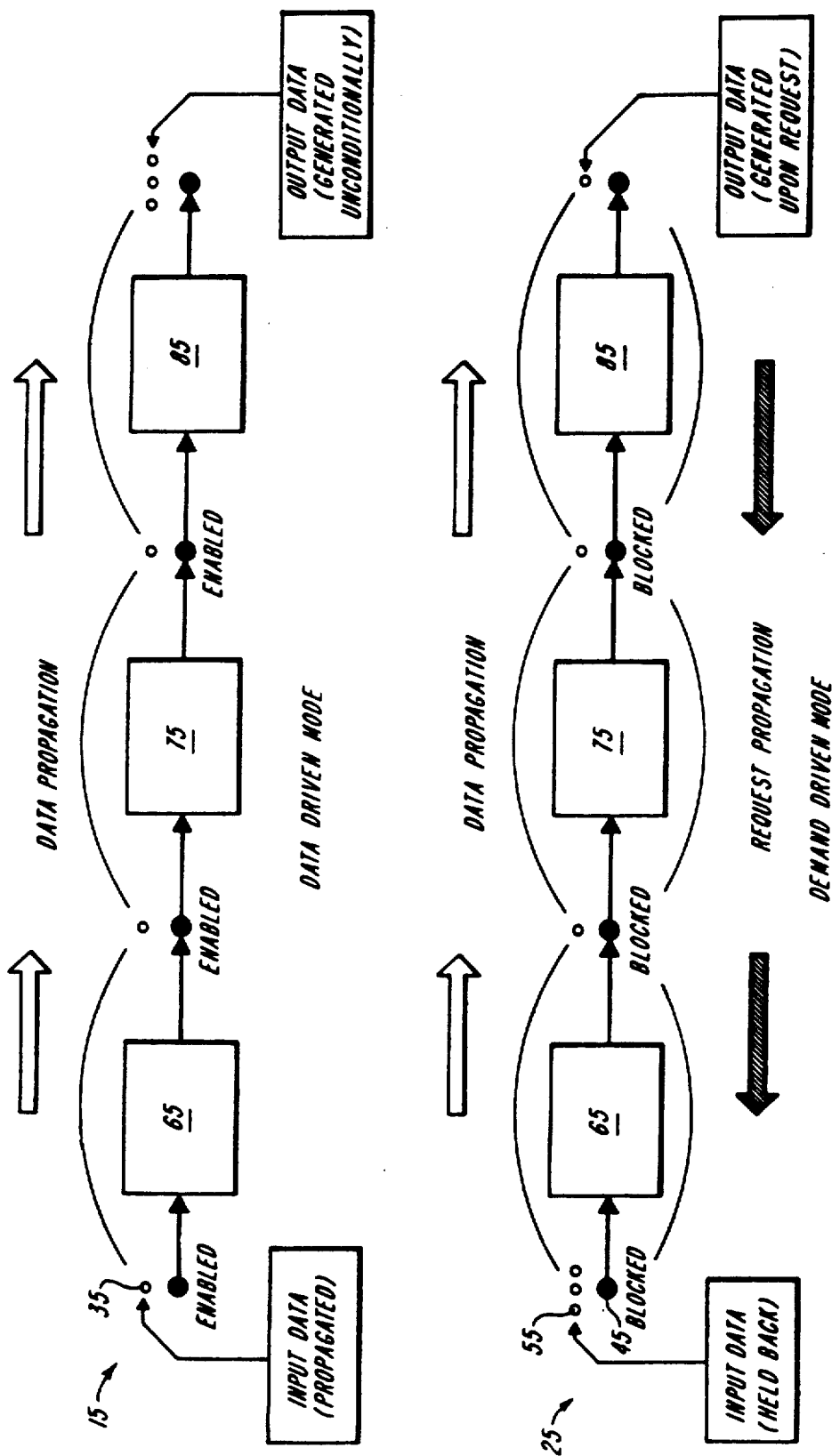
FIG. 4 shows a model operating in data-driven mode and in demand-driven mode.

FIG. 4 shows the dynamically configured system of the present invention operating in demand-driven mode 25 and data-driven mode 15. When the actor nodes 65, 75 and 85 are executing using demand-driven scheduling, the scheduler executes only the actor nodes that are needed in order to provide the requested data 55. When an actor node receives data, it does not propagate the data 55 forward through the model until requested. In data-driven scheduling, the actor nodes 65, 75 and 85 execute as soon as the necessary input data 35 becomes available.

The actor nodes will fire upon a particular condition. The firing of the actor node causes the computational unit associated with the actor node to be sent to the available system resources for execution. There are two types of control disciplines available, if-all mode, and if-any mode. In "if-all" mode, at least one data unit must be available for all of the active inputs of the node. In "if-any" mode, every new data will cause the actor node to fire. In the preferred embodiments, two actor node interface calls are available for the kernel to request data from an actor node. The "Obtain" call is used with actor nodes that can be either in demand-driven or in data-driven modes. If data is available at the node, the actor node will return the data. If no data is available, the actor node will propagate the request. The "Receive" call is used with a actor node that can only be in data driven mode. "Receive" causes the actor node to return "Empty" if there is no data present, or to return the data.

When the data propagation enable flag is set, the control model runs in the data-driven mode. Each data packet is immediately propagated to the consumer actor nodes as it is produced. Once an actor node receives all the input data it needs, it becomes schedulable, and it will be executed as soon as there are available resources.

In demand-driven mode, once the actor node is executing, it will try to read the data from the data node. If the data does not yet exist, the actor node can be programmed to either use an algorithm that allows the use of only a subset of data or to propagate the request one step backwards in the computational model, to the input data nodes of the actor. The actor node's execution will then be aborted.

The request continues to be propagated backwards from actor node to actor node until a data node which is already storing data is reached. This backwards propagation results in a set of request paths in the control model, along which the required data can be propagated in a forward direction by performing the computations associated with the actor nodes in the path. This is called the retract phase of the request propagation.

The propagation technique ensures that only the computations that are necessary to satisfy the original request, and not other activities, are actually performed. Once the retract phase ends, the outstanding request flags of the involved data nodes are cleared, and no computations can be started in the control model parts which use demand-driven evaluation until a new request is received.

The scheduler of the present invention allows the control model to operate in either data-driven mode, demand-driven mode, or a combination of both. The scheduler enables local selection of these modes by associating a data propagation enable flag with each data node.

Figure 5:
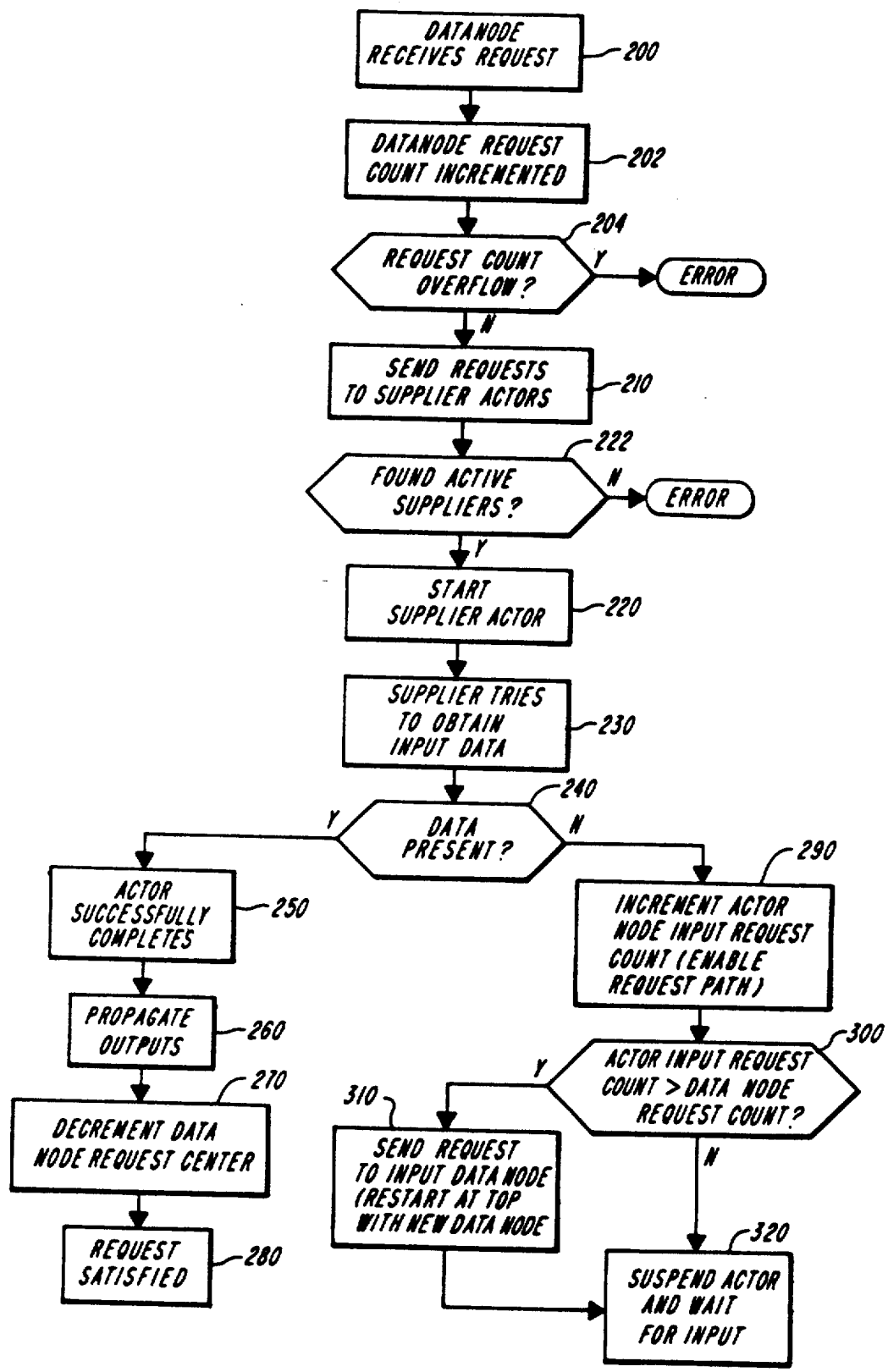
FIG. 5 is a flowchart showing how data requests propagate backward through the model.

Referring to FIG. 5, when a data node receives a request at 200, it increments its request counter at 202 and sends the request to the connected active supplier actors at 210 if there has been no count overflow at 204. (The kernel sends a request to a data node when a read operation is attempted on a data node. The read operation can be attempted by either a connected actor node or by an external program, such as a user interface.) When the data node receives a request, the kernel starts the supplier actor 220 (tested for at 222), which is connected to the data node's input ports. The supplier actor attempts to obtain the necessary input data at 230, from its input data nodes. If data is present, as tested at 240, the actor node will successfully complete at 250 and will propagate its outputs to the next data node at 260. The data node request counter is then decremented at 270, and the request considered satisfied at 280.

If the data node is found empty at 240, the actor node input port request counter is incremented at 290. This tells the data node to propagate the data when it receives it. If the actor input request count is greater than the data node request count, as tested at 300, the actor node requires additional data before it can proceed. Accordingly, if the actor node needs more data, a request is sent at 310 to the necessary input data node, the process suspends at 320, and the process begins again when the data node receives a request 200. If the actor input request count is still less than or equal to the data node request count at 300, the execution of the actor node is suspended at 320 until the requested data arrives. The actor node will be executed when it has the necessary data.

Figure 6:
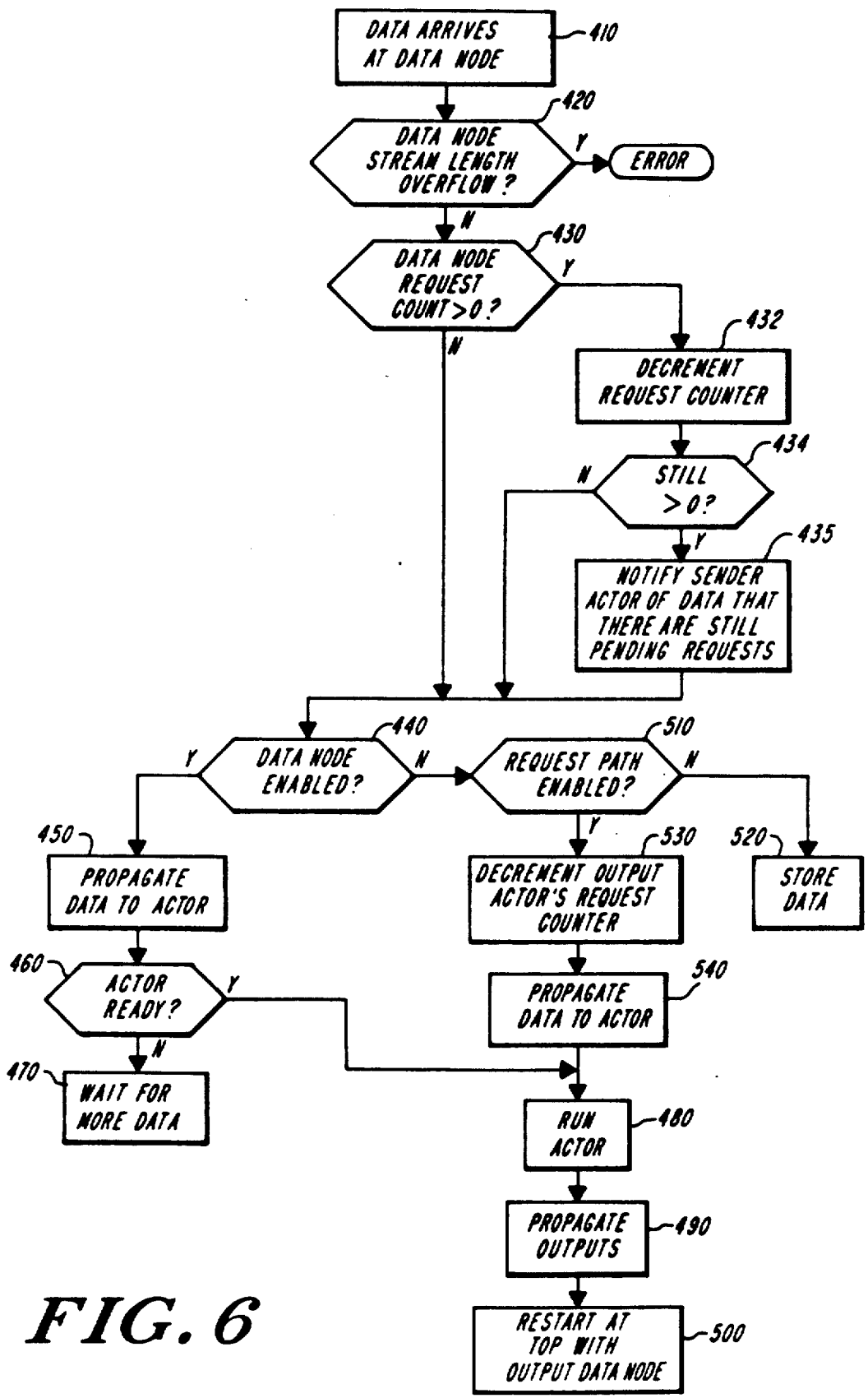
FIG. 6 is a flowchart showing how data propagates forward through the model.

Referring to FIG. 6, when data arrives at a data node in a data-driven mode as indicated at 410, the data node checks, at 420, whether the data has exceeded its stream length. If the data length is normal, and if the data node has an outstanding request count, as tested at 430, then the count is decremented at 432, and if still greater than zero at 434, additional data is needed, and the supplier actor is started again at 435. The system then checks, at 440, whether the node is operating in a data-driven mode or in a demand-driven mode. If it is operating in a data-driven mode, the data node is enabled, and the data is propagated, at 450, to the actor. If the actor node is not ready, as tested at 460, the system will wait for more data at 470. If it is ready, the actor node will execute at 480. The actor node propagates data output at 490 to the output data nodes. As data arrives at the output data node, the process begins again at 10, as indicted at 500.

When the system, or a specific data node, is operating in the demand-driven mode when tested at 440, the data node first checks at 510 whether the request path is enabled, showing that there is an outstanding request to the data node. If there is not an outstanding request, the data node will store the data at 520. If there were an enabled request path at 510, the output actor's request counter is decremented, at 530, by one, and the data is propagated to the requesting actor node at 540. Thereafter, the method follows the sequence 480, 490, 500 described above.

Figure 7:
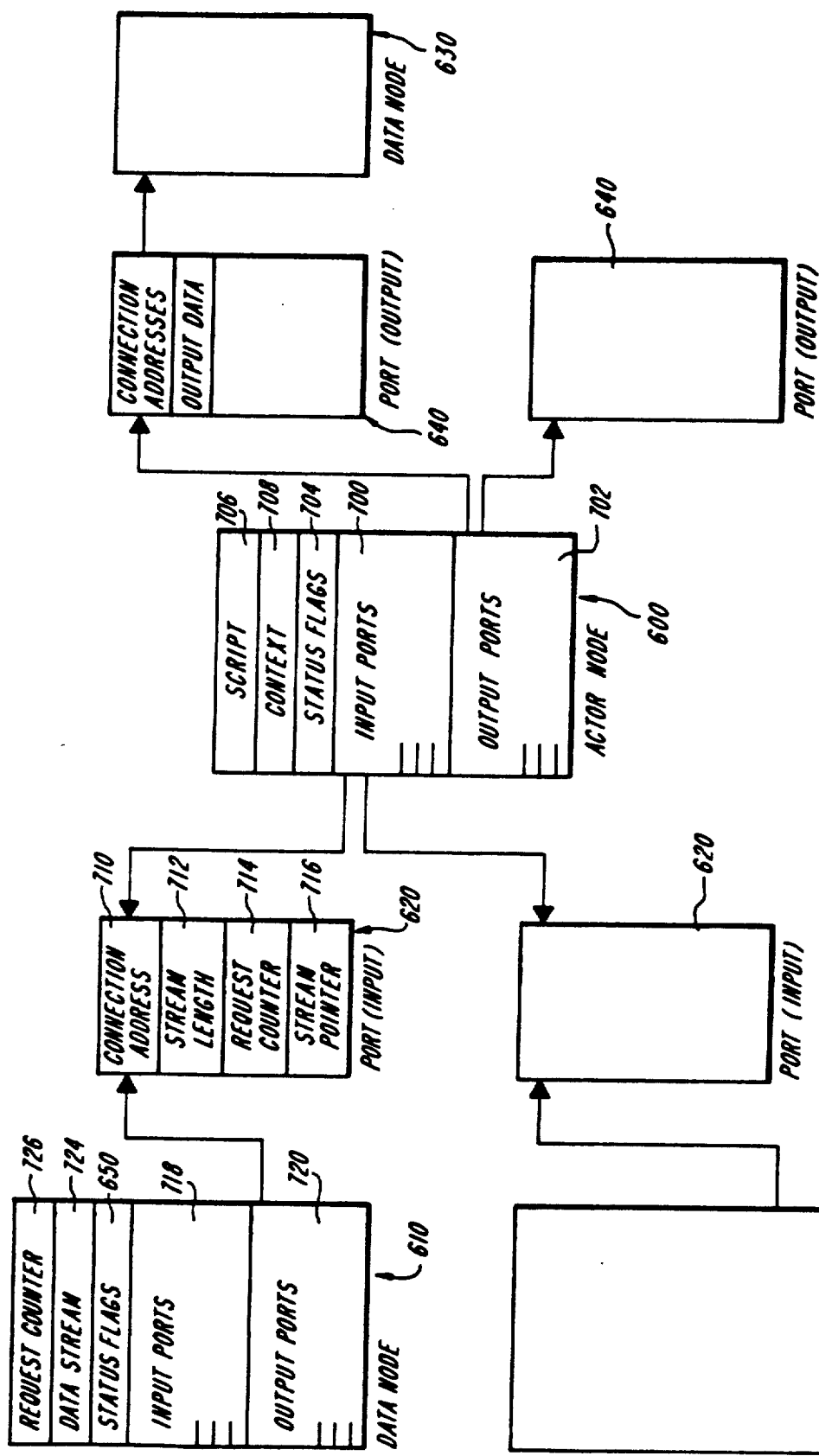
FIG. 7 shows the actor node and data node data structure and communication paths.

FIG. 7 shows the actor node and data node data structure and communication paths. An actor node 600 communicates with each input providing data node 610 through an input port 620. The actor node communicates its results to each output receiving data node 630 through an output port 640. The data structure or format of each actor node provides for pointers to both the input ports which feed the actor node and the output ports to which the actor node can direct data. The input port pointers are stored at 700 and the output ports pointers are stored at 702. The actor node data structure also provides for a plurality of status flags to be stored at 704 and for the actor node to have therein a script and context data storage at 706 and 708 respectively. The script storage provides an executable program module for the actor node. The context storage provides a local data structure for the actor node.

The input port stores the connection addresses at 710 which connect the output ports of a data node 610 to the actor node 600 requiring the data. For each transmission the input port also stores the stream length, the request counter, and the stream pointer at 712, 714, and 716, respectively. The stream length 712 corresponds to the size of the data stream in the data node, while the stream pointer 716 points to the current position in the data stream where data is being read from.

Each data node 610, 630 provides the address of the plurality of input ports and output ports to which it is connected at 718 and 720, respectively. The data nodes, like the actor node 600, also store status flags indicating the state of the node at 722. The outstanding request flag and the data propagation flag are stored with other status flags 722 in the data node 610. Further, the data node stores information regarding the data stream at 724 and provides storage of the various requests which it receives at 726.

The remaining element, referring to FIG. 7, the output ports, like the input ports, store the connection addresses of the actor and data nodes to which they are connected at 728 and further provide the output data which may be available from an actor node at 730. This output data is available to the data node upon request.

Accordingly, a process control system such as that illustrated in FIG. 1 can be modeled as a network having a combination of actor nodes and data nodes which itself can be operated in a data driven or demand driven mode. By mixing the combination of data driven and demand driven operating modes, advantageous performance is achieved.

Additions, deletions, and other modifications of the described embodiment will be apparent to those practiced in the art and are within the scope of the following claims.

What is claimed is:

1. A method for effecting the transfer of data for use in a model-based dynamically configured system having a set of connection specifications defining a data flow path having actor nodes and data nodes, wherein data propagates in a forward direction through said data flow path and requests propagate in a reverse direction through said data flow path, each actor node operating upon received data from data nodes in accordance with a predefined series of instructions, and each data node acting to receive data from actor nodes, and to store and transmit said data;

said method for effecting the transfer of data through the model comprising the steps of propagating data from data nodes operating in a data driven mode of operation to connecting actor nodes according to said connection specification as data is available for transmission from each said data driven data node;

propagating data from data nodes operating in a demand driven mode of operation to connecting actor nodes according to said connection specification as data is available for transmission at each of said demand driven data nodes only if said data node has a request, and simultaneously with said propagating data steps, propagating requests from said actor nodes to said connected data nodes according to said connection specification as said actor nodes generate said request.

2. The method of claim 1 wherein said step of propagating data from data nodes operating in a data driven mode of operation to actor nodes and said step of propagating data from data nodes operating in a demand driven mode of operation to actor nodes comprise the steps of:

storing a data propagation enable flag at each of said data nodes;

storing an outstanding request counter at each of said data nodes;

propagating data immediately from each said data node having data available for transmission to connected actor nodes if the data propagation enable flag of said data node is in a first set state; and storing available data at each said data node if said data propagation enable flag of said data node is in a second clear state, and propagating said data to a said connected actor node only if the outstanding request counter of said data node is in a first selected state.

3. The method of claim 2 further comprising, after propagating a request from a requesting actor node to a request-receiving data node, the steps of:

propagating said request from said request-receiving data node to at least one connecting request-receiving actor node according to said connection specification if said request-receiving data node does not have the requested data; and propagating said data from said request-receiving data node to said requesting actor node if said request-receiving data node has the requested data.

4. The method of claim 3 further comprising, after propagating said request from said request-receiving data node to said connected request-receiving actor node, the steps of executing said request-receiving actor node, if said actor node has the requested data, and delaying the execution of said request-receiving actor node when less than all of the data required for complete actor node operation is available to said request-receiving actor node.

5. The method of claim 2 further comprising the steps of:

storing an outstanding request counter at each of said actor nodes;

incrementing said request counter of a requesting actor node when said requesting actor node propagates a request; and decrementing said request counter of said requesting actor node when the requested data is received by the requesting actor node.

6. The method of claim 2 wherein said data flow path further comprises at least one actor node input port to which a connected data node directs data to be sent to an associated connected actor node;

each actor node input port having an actor node input port request counter, and wherein said method further comprises the steps of:

incrementing the actor node input port request counter of a requesting actor node when said requesting actor node propagates a request to a request-receiving data node, incrementing the data node request counter of said request-receiving data node when said request-receiving data node receives said request from said requesting actor node, decrementing said data node request counter when said request-receiving data node propagates data to said requesting actor node; and decrementing said actor node input port request counter when said requesting actor node receives the data which satisfies said request.

7. The method of claim 6 wherein said data flow path further comprises;

at least one actor node output port from which said actor node directs data to be sent to a connected data node; and wherein said method further comprises the step of:

controlling the flow of data in said data flow path by incrementing and decrementing said data node request counter and said actor node input port request counter.

8. The method of claim 6 wherein said data flow path further comprises at least one actor node output port from which an associated actor node directs data to be sent to a connected data node;

each actor node output port having an actor node output port request counter, and wherein said method further comprises the steps of:

incrementing the data node request counter of a requesting data node when said requesting data node sends a request to a said request-receiving actor node;

incrementing the actor node output port request counter of said request-receiving actor node when said request-receiving actor node receives a said request from said requesting data node, decrementing said actor node output port request counter when said request-receiving actor node propagates data to said requesting data node:

decrementing said data node request counter when said requesting data node receives the data which satisfies said request.

9. The method of claim 6 further comprising the step of propagating a request from a requesting actor node to a connected data node if the value of said actor node input port request counter is greater than the value of the request counter of said connected data node.

10. For use in a model-based dynamically configured system comprising a set of connection specifications defining a data flow path having actor nodes and data nodes, wherein data propagates in a forward direction through said data flow path and requests propagate in a reverse direction through said data flow path, each actor node operating upon received data from data nodes in accordance with a predefined series of instructions, and each data node acting to receive data from actor nodes, and store and transmit said data;

apparatus for effecting the transfer of data through the model comprising means for propagating data from data nodes operating in a data driven mode of operation to connecting actor nodes according to said connection specification as data is available for transmission from each said data driven data node;

means for propagating data from data nodes operating in a demand driven mode of operation to connecting actor nodes according to said connection specification as data is available for transmission at each of said demand driven data nodes only if said data node has a request, and means for propagating requests, simultaneously with said means for propagating data, from said actor nodes to said connected data nodes according to said connection specification as said actor nodes generate said requests.

11. The apparatus of claim 10 wherein said means for propagating data from data nodes operating in a data driven mode of operation to actor nodes and said means for propagating data operating in a demand driven mode of operation from data nodes to actor nodes comprise:

means for storing a data propagation enable flag at each of said data nodes;

means for storing an outstanding request counter at each of said data nodes;

means for propagating data immediately from each said data node having data available for transmission to connected actor nodes if the data propagation enable flag of said data node is in a first set state; and means for storing available data at each said data node if said data propagation enable flag of said data node is in a second clear state, and propagating said data to a said connected actor node only if the outstanding request counter of said data node is in a first selected state.

12. The apparatus of claim 11 further comprising, after propagating a request from a requesting actor node to a request-receiving data node:

means for propagating said request from said request-receiving data node to at least one connecting request-receiving actor node according to said connection specification if said request-receiving data node does not have the requested data; and means for propagating said data from said request-receiving data node to said requesting actor node if said request-receiving data node has the requested data.

13. The apparatus of claim 12 further comprising, after propagating said request from said request-receiving data node to said connected request-receiving actor node, means for executing said request-receiving actor node, if said actor node has the requested data, and means for delaying the execution of said request-receiving actor node when less than all of the data required for complete actor node operation is available to said request-receiving actor node.

14. The apparatus of claim 11 further comprising:

an outstanding request counter at each of said actor nodes;

means for incrementing said request counter of a requesting actor node when said requesting actor node propagates a request, and means for decrementing said request counter of said requesting actor node when the requested data is received by the requesting actor node.

15. The apparatus of claim 11 wherein said data flow path further comprises at least one actor node input port to which a connected data node directs data to be sent to an associated connected actor node;

each actor node input port having an actor node input port request counter, and said apparatus further comprising means for incrementing the actor node input port request counter of a requesting actor node when said requesting actor node propagates a request to a request-receiving data node;

means for incrementing the data node request counter of said request-receiving data node when said request-receiving data node receives said request from said requesting actor node, means for decrementing said data node request counter when said request-receiving data node propagates data to said requesting actor node; and means for decrementing said actor node input port request counter when said requesting actor node receives the data which satisfies said request.

16. The apparatus of claim 15 wherein said data flow path further comprises at least one actor node input port to which a connected data node directs data to be sent;

at least one actor node output port from which said actor node directs data to be sent to a connected data node; and said apparatus further comprising means for controlling the flow of data in said data flow path by incrementing and decrementing said data node request counter and said actor node input port request counter.

17. The apparatus of claim 15 wherein said data flow path further comprises:

at least one actor node output port from which an associated actor node directs data to be sent to a connected data node;

each actor node output port having an actor node output port request counter, and wherein said apparatus further comprises:

means for incrementing the data node request counter of a requesting data node when said requesting data node sends a request to a said request-receiving actor node;

means for incrementing the actor node output port request counter of said request-receiving actor node when said request-receiving actor node receives a said request from said requesting data node, means for decrementing said actor node output port request counter when said request-receiving actor node propagates data to said requesting data node;

means for decrementing said data node request counter when said requesting data node receives the data which satisfies said request.

18. The apparatus of claim 15 further including means for propagating a request from a requesting actor node to a connected data node only if the value of said actor node input port request counter is greater than the value of the request counter of said connected data node.

* * * * *